Sept. 25, 1951 J. P. SMITH 2,568,935
LUBRICATED PLUG VALVE
Filed Dec. 29, 1945 2 Sheets-Sheet 1

JOPLING P. SMITH
INVENTOR.

BY Lester B. Clark
& Ray L. Smith
ATTORNEYS

Sept. 25, 1951  J. P. SMITH  2,568,935
LUBRICATED PLUG VALVE
Filed Dec. 29, 1945  2 Sheets-Sheet 2

JOPLING P. SMITH
*INVENTOR.*

BY Lester B. Clark
 & Ray L. Smith
ATTORNEYS

Patented Sept. 25, 1951

2,568,935

UNITED STATES PATENT OFFICE 2,568,935

LUBRICATED PLUG VALVE

Jopling P. Smith, Houston, Tex., assignor to Garrott Brass & Machine Company, Inc.

Application December 29, 1945, Serial No. 638,096

1 Claim. (Cl. 251—93)

The invention relates to what is generally known as a kelley cock or plug valve. Valves of this type are generally used in a string of pipe employed in the rotary method of drilling wells and positioned above the grief stem or kelley connected to the top of the string of pipe. The valve is usually utilized to close the flow through the pipe under various circumstances and conditions.

While the invention will be described as applied to this particular use, it is to be understood that the valve may be utilized as a plug valve in other situations.

It is one of the objects of the invention to provide a lubricated plug valve wherein a seal may be maintained around the downstream flow port.

Another object of the invention is to provide a removable seat plate carrying a sealing material reservoir for plug valves.

Still another object of the invention is to provide a kelley cock wherein the high pressure is used to automatically maintain sealing material about the downstream port when the valve is closed.

Other and further objects of the invention will be readily apparent when the following description is considered in connection with the accompanying drawings, wherein—

Figure 1:
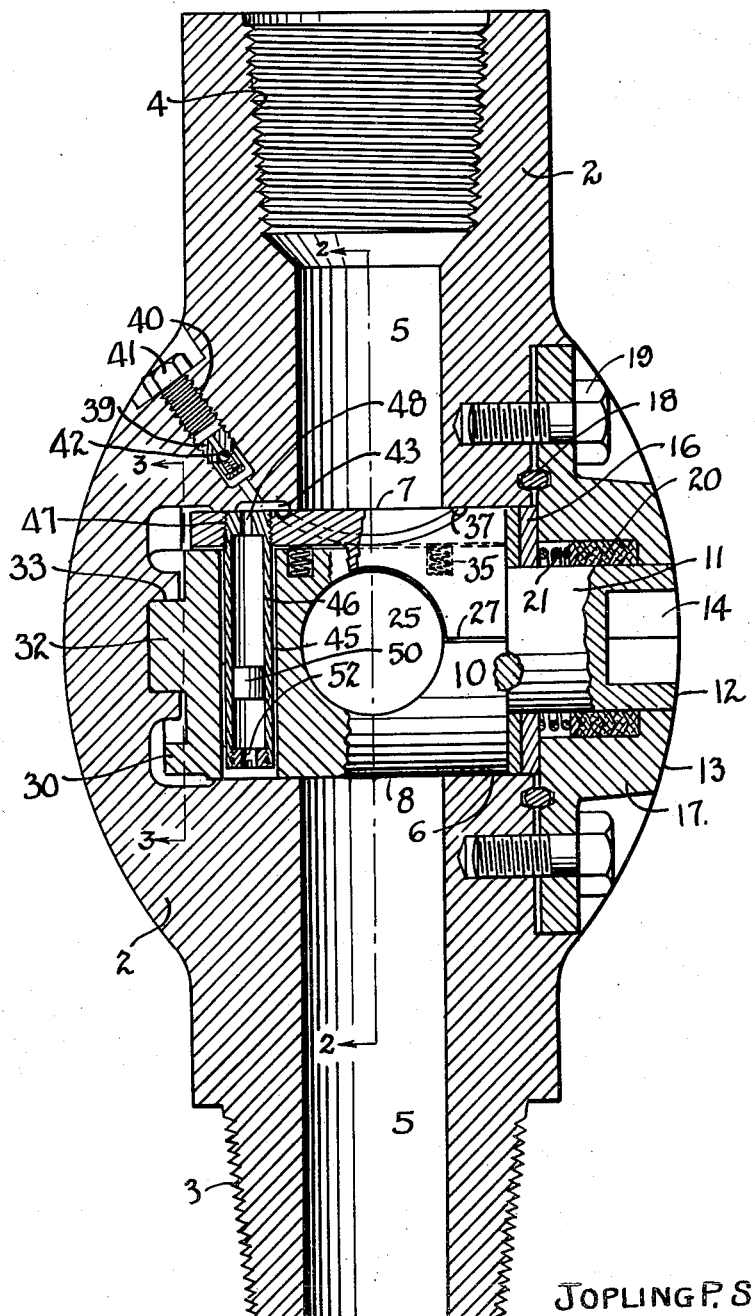
Figure 2:
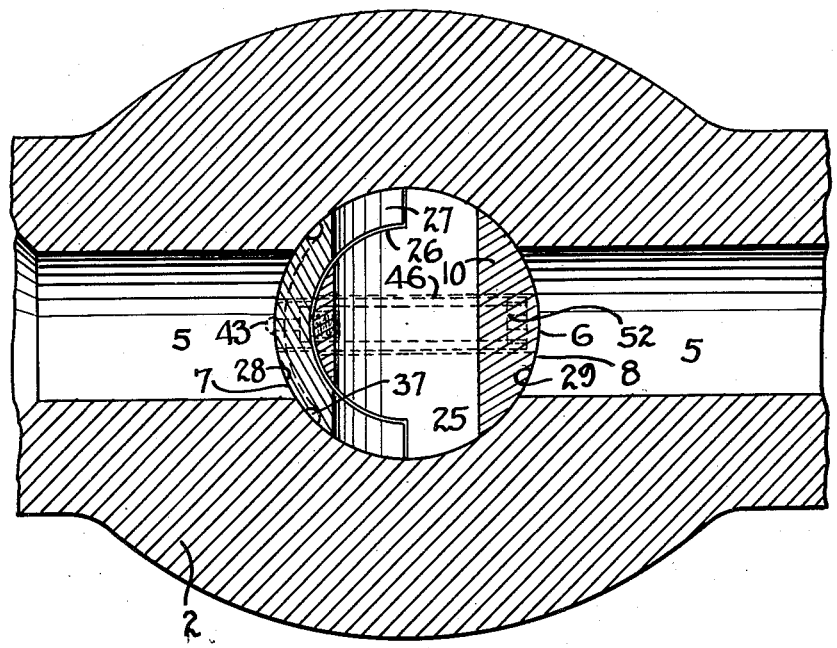
Figure 3:
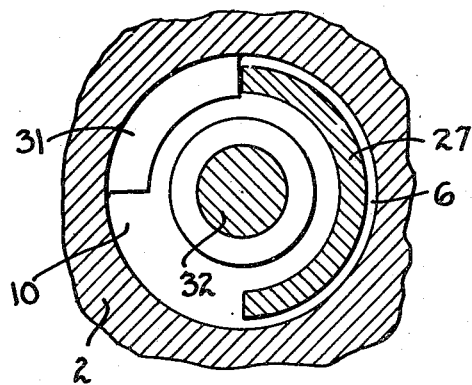

Fig. 1 is a vertical sectional view illustrating the kelley cock and the various parts thereof in closed position;

Figs. 2 and 3 are sections taken on the lines 2—2 and 3—3 respectively of Fig. 1.

In Fig. 1 the housing 2 is provided with a threaded pin 3 for connection to the pipe while the upper end is provided with a threaded box 4 to also receive the swivel. The housing has a flow passage 5 therethrough which is interrupted or intersected by the plug chamber 6. This forms the flow ports 7 and 8 and it is intended that 8 will be the upstream or high pressure flow port while 7 is the downstream or low pressure flow port.

Arranged for rotation in the chamber 6 is the plug 10 having the stem 11 thereon which has its outer end 12 flush with the curved surface 13 which forms the surface of the housing. A non-circular portion 14 permits introduction of a tool to turn the plug.

The plug is retained in place by the thrust plates 16 held in position by a cap 17 which is sealed to the housing with the seal rings 18 with the entire assembly held in place by the cap screws 19. In order to seal about the stem a packing 20 is normally urged to sealing position by a coil spring 21.

The plug 10 is of peculiar formation as best seen in Figs. 1 and 2 and has the flow passage 25 therethrough. One side of the plug is recessed at 26 over about half of its periphery so as to receive a semi-cylindrical seat plate 27 which fits into the recess and whose outer face 28 then completes the periphery 29 of the plug. The base of the plug is provided with a lug or projection 30 slidable in a recess 31 so as to limit the turning movement of the plug to approximately one quarter of a turn. The spindle 32 fitting in the recess 33 in the base of the plug centers the plug and permits rotation thereof.

The seat plate is intended to form a seal with the surface of the chamber 6 in the downstream flow port 7. Small springs 35 tend to urge the seat plate away from the plug and against the flow port 7. In order to maintain a seal about the flow port 7, the seat plate has a distribution groove 37 in the face 28 thereof. This groove preferably is circular and as seen in Fig. 1 extends about the flow port 7 when the valve is in closed position.

In order to feed sealing material into this groove an injection fitting 39 is disposed in the opening 40 in the body of the valve and this opening is arranged to be closed with the screw 41. A check valve 42 prevents leakage of the material from inside of the valve.

The material being injected through the fitting passes into the conduit 43 which is arranged to connect the reservoir 46 with the distribution groove 37 when the valve is in closed position.

In order that a supply of sealing material may be disposed in the valve and available for sealing the plug when the valve is manipulated, the plug 10 has a transverse opening 45 therein which is arranged to receive a hollow cylindrical reservoir 46. This reservoir is shown threaded at 47 into an opening in the plate 27 so that it is supported by the plate in the opening 45. The end of the reservoir 46 which is adjacent the face of the plate has a passage 48 therein by which sealing material may pass into the reservoir when it is introduced through the fitting 39.

A barrier 50 is slidable in the hollow reservoir and will be moved downwardly as seen in Fig. 1 when the sealing material is introduced. Another opening 52 in the base of the reservoir is arranged to admit pressure from the upstream side of the plug valve, that is, the higher pressure which is against the valve. This pressure moving into the reservoir will tend to raise the barrier 50 when the valve is in use so as to maintain a seal of material in the groove 37.

An advantage of the assembly just described is that the valve may be used for long periods of time without servicing to introduce sealing material and further when the parts of the valve are to be renewed or repaired, the plate 27 and the reservoir 26 can be removed as a unit and a new unit comprising the plate and reservoir applied to the plug 10.

It is believed that the operation and use of the valve will be readily apparent from the foregoing description.

What is claimed is:

A drill stem kelley valve including a housing, a transverse plug chamber therein, a flow passage through the housing and crossing said chamber to provide a downstream seat at the top of said chamber, a rotatable plug in said chamber, an arcuate seat plate recessed into said plug and movable therewith, a face on said plate extending across said seat when the plug is in closing position, and means to provide a seal on the face of said plate including a distribution groove in the face encircling said downstream seat, a reservoir member carried by the plate and projecting diametrically into said plug, and an injection fitting on said body for plastic sealing material, a conduit from said fitting connected to each said groove and said reservoir to fill said groove and to also fill said reservoir independent of said groove.

JOPLING P. SMITH.

REFERENCES CITED

The following references are of record in the file of this patent:

UNITED STATES PATENTS

| Number | Name | Date |
| --- | --- | --- |
| 2,176,730 | Church | Oct. 17, 1939 |
| 2,269,887 | Sharp | Jan. 13, 1942 |
| 2,391,278 | Stark | Dec. 18, 1945 |
| 2,418,404 | Greenlee | Apr. 1, 1947 |

FOREIGN PATENTS

| Number | Country | Date |
| --- | --- | --- |
| 192,433 | Germany | Oct. 3, 1906 |